(12) United States Patent
Mori et al.

(10) Patent No.: US 10,843,321 B2
(45) Date of Patent: Nov. 24, 2020

(54) POWER TOOL

(71) Applicant: MAKITA CORPORATION, Anjo (JP)

(72) Inventors: Keita Mori, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 177 days.

(21) Appl. No.: 16/107,212

(22) Filed: Aug. 21, 2018

(65) Prior Publication Data
US 2019/0061132 A1 Feb. 28, 2019

(30) Foreign Application Priority Data

Aug. 29, 2017 (JP) .................................. 2017-164309

(51) Int. Cl.
| | |
|---|---|
| *B25D 17/24* | (2006.01) |
| *B25D 17/04* | (2006.01) |
| *B23D 51/16* | (2006.01) |
| *B25F 5/00* | (2006.01) |
| *B25F 5/02* | (2006.01) |

(52) U.S. Cl.
CPC ............ *B25D 17/24* (2013.01); *B23D 51/16* (2013.01); *B25D 17/043* (2013.01); *B25F 5/006* (2013.01); *B25F 5/026* (2013.01); *B25D 2211/061* (2013.01); *B25D 2250/095* (2013.01); *B25D 2250/121* (2013.01)

(58) Field of Classification Search
CPC .... B25F 5/00; B25F 5/02; B25F 5/025; B25F 5/026; B25F 5/027; B25F 5/006; B25D 17/04; B25D 17/043; B25D 17/046; B25D 17/048; B25D 17/24; B25D 17/245; B25D 2250/121; B25D 2250/095; B23D 51/16
USPC ... 173/162.1, 162.2, 170, 109, 217, 201, 48, 173/210; 310/50, 230, 239
See application file for complete search history.

(56) References Cited

U.S. PATENT DOCUMENTS

| | | | | |
|---|---|---|---|---|
| 3,440,465 | A * | 4/1969 | Provost, Jr. ............ | H02K 23/18 310/230 |
| 4,523,116 | A * | 6/1985 | Dibbern, Jr. ........... | H01H 9/063 200/8 R |
| 4,749,049 | A * | 6/1988 | Greppmair .............. | F16F 15/08 173/162.2 |
| 4,978,877 | A * | 12/1990 | Quirijnen ............... | H02K 23/18 310/239 |
| 5,692,574 | A * | 12/1997 | Terada ................. | B25D 17/043 173/162.2 |

(Continued)

FOREIGN PATENT DOCUMENTS

JP 2016-093867 A 5/2016

*Primary Examiner* — Scott A Smith
(74) *Attorney, Agent, or Firm* — Oliff PLC (57) ABSTRACT

A power tool includes a tool body, a motor, a handle part, and an elastic member. The tool body extends along the driving axis in the front-rear direction. The motor has a motor shaft. The motor shaft is rotatably supported by the tool body and extends in the front-rear direction. The handle part includes a grip part. The grip part extends in a direction crossing the driving axis. The elastic member is interposed between a rear end portion of the motor shaft and an inner wall surface of the handle part. The elastic member biases the motor shaft and the handle part away from each other in the front-rear direction.

11 Claims, 8 Drawing Sheets

(56) References Cited

U.S. PATENT DOCUMENTS

| | | | | |
|---|---|---|---|---|
| 6,464,018 | B1* | 10/2002 | Uhl | B23B 45/048 173/162.2 |
| 6,479,918 | B1* | 11/2002 | Burger | H02K 23/18 310/239 |
| 6,930,431 | B2* | 8/2005 | Buck | H01H 9/063 310/239 |
| 7,190,100 | B2* | 3/2007 | Riedl | H02K 23/18 310/239 |
| 7,355,314 | B2* | 4/2008 | Riedl | H02K 23/18 310/239 |
| 7,591,325 | B2* | 9/2009 | Robieu | B25D 17/043 173/162.2 |
| 7,886,838 | B2* | 2/2011 | Hahn | B25D 17/043 16/110.1 |
| 8,196,674 | B2* | 6/2012 | Ikuta | B25D 17/24 173/162.1 |
| 8,403,076 | B2* | 3/2013 | Iwakami | B25D 17/043 173/162.1 |
| 8,708,059 | B2* | 4/2014 | Hahn | B25D 17/043 173/162.1 |
| 2009/0266571 | A1* | 10/2009 | Baumann | B25D 17/24 173/162.2 |
| 2015/0144368 | A1* | 5/2015 | Machida | B25F 5/006 173/162.2 |
| 2015/0266176 | A1* | 9/2015 | Takeuchi | B25D 17/20 173/117 |
| 2016/0136801 | A1 | 5/2016 | Furusawa et al. | |

* cited by examiner

POWER TOOL

CROSS-REFERENCE TO RELATED APPLICATION

The present application claims priorities to Japanese patent application No. 2017-164309 filed on Aug. 29, 2017. The contents of the foregoing application are incorporated fully herein by reference.

TECHNICAL FIELD

The present invention relates to a power tool configured to linearly reciprocate a tool accessory by power of a motor.

BACKGROUND ART

A hand-held power tool is known that performs a processing operation on a workpiece by linearly reciprocating a tool accessory along a prescribed driving axis by power of a motor. For example, Japanese laid-open patent publication No. 2016-93867 discloses a hammer drill that includes a body housing and a handle part. The body housing houses a motor and a driving mechanism for driving a tool accessory. The handle part includes a grip that extends in a direction crossing a driving axis. The motor is disposed in a motor housing, which forms a rear portion of the body housing, such that a motor shaft extends in parallel to the driving axis in a front-rear direction.

SUMMARY

In a power tool having a structure that is similar to that of the hammer drill described above, a measure is sometimes taken to prevent a backlash (looseness) of the motor shaft in the axial direction when the motor shaft is rotatably supported by the body housing. For example, in the hammer drill described above, the motor is housed in a cylindrical motor housing which is formed in one piece, and a bottomed cylindrical bearing holding part is provided in a rear end portion of the motor housing. In such a case, a wave washer may be fitted into the bearing holding part and then the bearing and the motor shaft may be inserted from the front into the motor housing, so that the backlash of the motor shaft in the axial direction can be prevented by an elastic force of the wave washer. It may, however, be difficult to mount such a wave washer, for example, in a motor housing of a type which is formed by connecting two halves in the left-right direction.

Accordingly, it is an object of the present invention to provide a rational structure for preventing a backlash of a motor shaft, in a power tool configured to linearly reciprocate a tool accessory by power of a motor.

According to one aspect of the invention, a power tool is provided that is configured to linearly reciprocate a tool accessory along a driving axis extending in a front-rear direction. The power tool includes a tool body, a motor, a handle part and an elastic member.

The tool body extends along the driving axis in the front-rear direction. The motor has a motor shaft that is rotatably supported by the tool body and that extends in the front-rear direction. The handle part includes a grip part that extends in a direction crossing the driving axis. The elastic member is interposed between a rear end portion of the motor shaft and an inner wall surface of the handle part. The elastic member biases the motor shaft and the handle part away from each other in the front-rear direction.

In the power tool according to this aspect, the elastic member is interposed between the rear end portion of the motor shaft, which is supported by the tool body and extends in the front-rear direction, and the inner wall surface of the handle part, and the elastic member biases the motor shaft forward. By thus interposing the elastic member between the rear end portion of the motor shaft and the inner wall surface of the handle part outside the tool body, the elastic member can be easily mounted, not only in a case where the tool body is cylindrically formed in one piece, but also in a case where the tool body is formed by connecting two halves. Further, by the elastic force of the elastic member, dimensional errors and assembling errors of the motor shaft and the tool body can be accommodated so that a backlash (looseness) of the motor shaft in the axial direction (the front-rear direction) can be prevented. Thus, according to this aspect, a rational structure for preventing the backlash of the motor shaft can be realized.

It is noted that, in this aspect, the power tool may generally represent a power tool configured to linearly reciprocate a tool accessory by power of a motor. Such power tools may include a hammer drill, an electric hammer and a reciprocating saw.

The tool body may also be referred to as a housing. The tool body may be formed, for example, by connecting two halves divided along the driving axis, or by connecting a plurality of parts in the front-rear direction.

Further, the kind of the elastic member is not particularly limited. For example, spring, rubber, and synthetic resin may be employed. Further, the manner that the elastic member is "interposed between" the rear end portion of the motor shaft and the inner wall surface of the handle part may include not only the manner that the elastic member is directly held therebetween, but also the manner that another member is interposed between the rear end portion of the motor shaft and the elastic member, and the manner that another member is interposed between the inner wall surface of the handle part and the elastic member In one aspect of the present invention, the tool body may have a rear end portion having an opening, and the elastic member may bias the motor shaft and the handle part away from each other in the front-rear direction through the opening. According to this aspect, the elastic member can be easily disposed between the rear end portion of the motor shaft and the inner wall surface of the handle part without interfering with the tool body. The "opening" of the rear end portion of the tool body is not limited to a "through-hole" formed through the wall of the tool body. For example, at least a space that extends in the front-rear direction and that communicates with the outside of the tool body may be provided on the rear side of the rear end portion of the motor shaft. Further, the manner that the elastic member biases the motor shaft and the handle part "through the opening" does not necessarily mean that the elastic member extends through the opening, but the elastic member may be disposed within the opening or between the opening and the inner wall surface of the handle part, as long as the elastic member is capable of biasing the motor shaft and the handle part.

In one aspect of the present invention, the power tool may further include a driving mechanism housed in the tool body and configured to linearly reciprocate the tool accessory along the driving axis by power of the motor. The tool body may include a driving mechanism housing part and a motor housing part. The driving mechanism may be housed in the driving mechanism housing part. The motor may be housed in the motor housing part, and the motor housing part may be arranged on a rear side of the driving mechanism housing part. At least the motor housing part of the tool body may be formed by connecting two halves. The two halves may be divided along a plane parallel to a rotation axis of the motor shaft. According to this aspect, the motor and other components to be disposed within the motor housing part can also be further easily mounted while the ease of mounting the elastic member is maintained. It is noted that the driving mechanism housing part and the motor housing part may be separately formed and connected to each other in the front-rear direction. In this case, the driving mechanism housing part may be formed by connecting two halves or cylindrically formed in one piece. The driving mechanism housing part and the motor housing part may be formed by connecting two halves that are divided in the left-right direction but integral or continuous in the front-rear direction.

In one aspect of the present invention, the handle part may be connected to the tool body via the elastic member so as to be movable in the front-rear direction relative to the tool body. In a power tool that is configured to linearly reciprocate a tool accessory, vibration is caused mainly in a direction of the driving axis (the front-rear direction) in the tool body. According to this aspect, transmission of vibration from the tool body to the handle part including the grip part can be effectively reduced by the elastic force of the elastic member. Further, the vibration isolating function of the handle housing can be additionally provided without increasing in size by utilizing the elastic member for preventing the backlash of the motor shaft.

In one aspect of the present invention, the power tool may further include a bearing and an intervening member. The bearing may be held by a rear end portion of the tool body and rotatably support the rear end portion of the motor shaft. The intervening member may be arranged to in contact with a rear end of the bearing and a front end portion of the elastic member. The elastic member may bias the motor shaft forward via the intervening member and the bearing. According to this aspect, compared with a structure in which the elastic member is arranged in direct contact with the motor shaft, assembling can be facilitated.

In one aspect of the present invention, the intervening member may be arranged with a clearance from the rear end portion of the tool body in the front-rear direction and may include an engagement part that is engaged with the front end portion of the elastic member. According to this aspect, the elastic member can be stably held while an allowable amount of positional shift (an allowable amount of dimensional errors or assembling errors) of the bearing (the motor shaft) relative to the rear end portion is defined.

In one aspect of the present invention, the tool body may include a driving mechanism housing part and a motor housing part. The driving mechanism may be housed in the driving mechanism housing part. The motor may be housed in the motor housing part, and the motor housing part may be connected to a rear side of the driving mechanism housing part. The handle part may include a covering part that covers at least the rear end portion of the motor housing part. Each of the motor housing part and the handle part may be formed by connecting right and left halves divided along a plane parallel to a rotation axis of the motor shaft, wherein a direction perpendicular to the driving axis and corresponding to an extending direction of the grip part is defined as an up-down direction and a direction perpendicular to the front-rear direction and the up-down direction is defined as a left-right direction. One of the covering part and the motor housing part may have a projection, and the other of the covering part and the motor housing part may have a guide hole. The projection may protrude toward the other of the covering part and the motor housing part in the left-right direction. The guide hole may be an elongate hole that is longer in the front-rear direction and has a depth in the left-right direction. The projection may be arranged in the guide hole. The projection may be configured to slide within the guide hole in the front-rear direction between a first position in which the projection is in contact with a front end of the guide hole and a second position in which the projection is in contact with a rear end of the guide hole, along with a movement of the handle part relative to the motor housing part.

According to this aspect, the projection and the guide hole formed in the covering part and the motor housing part can guide the movement of the handle part relative to the tool body in the front-rear direction and can also define a movable range (the rearmost position and the frontmost position) of the handle part relative to the tool body. Further, the direction of connecting the halves and the direction of engaging the projection and the guide hole are the same left-right direction, so that assembling can be facilitated. Further, the elongate hole that has a depth in the left-right direction and that is longer in the front-rear direction can be easily formed when the halves are formed. In a structure in which the projection that protrudes in the left-right direction is integrally formed with the halves, the projection can also be easily formed when the halves are formed. It is noted that the manner that the covering part "covers at least the rear end portion of the tool body" includes not only the manner that it covers only the rear end portion of the tool body, but also the manner that it covers the rear end portion of the tool body and another portion on the front side of the rear end portion. The manner of "covering" includes not only the manner that the covering part covers the rear end portion (and the portion on the front side thereof) in a sealed manner, but also the manner that the covering part having an opening covers the rear end portion (and the portion on the front side thereof).

DETAILED DESCRIPTION OF THE EMBODIMENTS

An embodiment of the present invention is now explained with reference to the drawings. In the following embodiment, a hand-held hammer drill 1 is shown as a power tool configured to linearly reciprocate a tool accessory.

Figure 1:
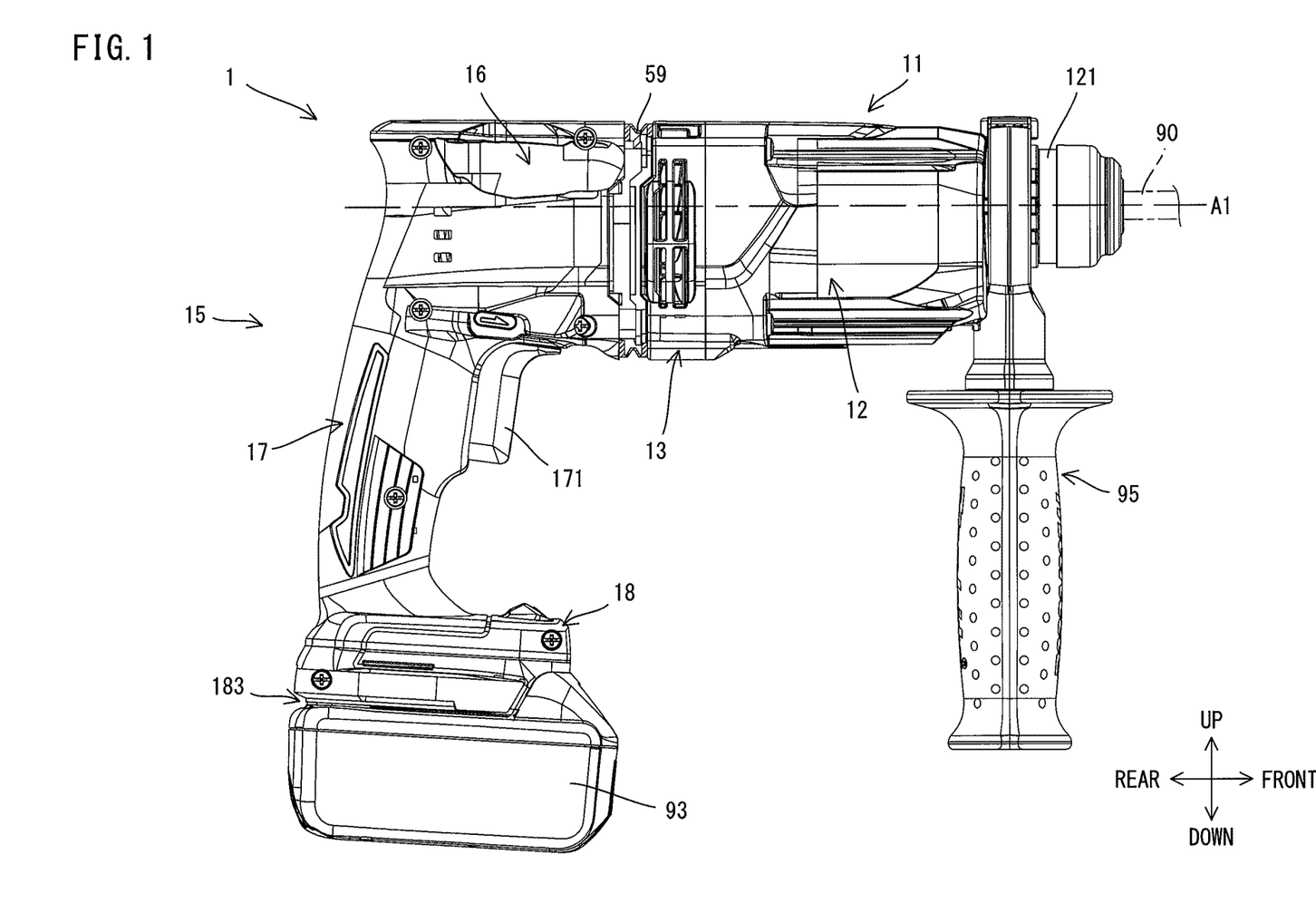
FIG. 1 is a right side view showing a hammer drill with an auxiliary handle mounted thereto.

First, a general structure of the hammer drill 1 is briefly explained with reference to FIG. 1. As shown in FIG. 1, an outer shell of the hammer drill 1 is mainly formed by a body housing 11 and a handle housing 15. In this embodiment, both the body housing 11 and the handle housing 15 are made of plastic.

The body housing 11 has an elongate form extending along a prescribed driving axis A1. A tool accessory 90 is removably attached to one end portion of the body housing 11 in a longitudinal axis direction, via a tool holder 30 (see FIG. 3) described below. Further, this one end portion of the body housing 11 has a circular cylindrical shape, and an auxiliary handle 95 formed separately from the hammer drill 1 may be removably attached to the periphery of this circular cylindrical portion. A handle housing 15 is connected to the other end portion of the body housing 11 in the longitudinal axis direction. The handle housing 15 includes a covering part 16 which covers a rear end portion of the body housing 11, and a grip part 17 designed to be held by a user. The grip part 17 extends in a direction crossing (more specifically, generally perpendicular to) the driving axis A1 and protrudes from the covering part 16 away from the driving axis A1.

The hammer drill 1 of this embodiment is configured to perform an operation (a hammering operation) of linearly reciprocating the tool accessory 90 along the driving axis A1, and an operation (a drilling operation) of rotationally driving the tool accessory 90 around the driving axis A1. In use, a user selects the tool accessory 90 of an appropriate kind and length according to an operation to be actually performed and attaches the tool accessory 90 to the hammer drill 1 such that an axis of the tool accessory 90 coincides with the driving axis A1.

The structure of the hammer drill 1 is now described in detail. In the following description, for convenience sake, an extending direction of the driving axis A1 (also referred to as the longitudinal axis direction of the body housing 11 or the axial direction of the tool accessory 90) is defined as a front-rear direction of the hammer drill 1. One side to which the tool accessory 90 is attached (or the side on which the tool holder 30 is disposed) is defined as a front side of the hammer drill 1, and the other side having the handle housing 15 is defined as a rear side of the hammer drill 1. Further, a direction which is perpendicular to the driving axis A1 and corresponds to the extending direction of the grip part 17 is defined as an up-down direction. The covering part 16 side is defined as an upper side and a protruding end (free end) side of the grip part 17 is defined as a lower side. Furthermore, a direction which is perpendicular to the front-rear direction and the up-down direction is defined as a left-right direction.

First, the body housing 11 and its internal structure are described.

Figure 3:
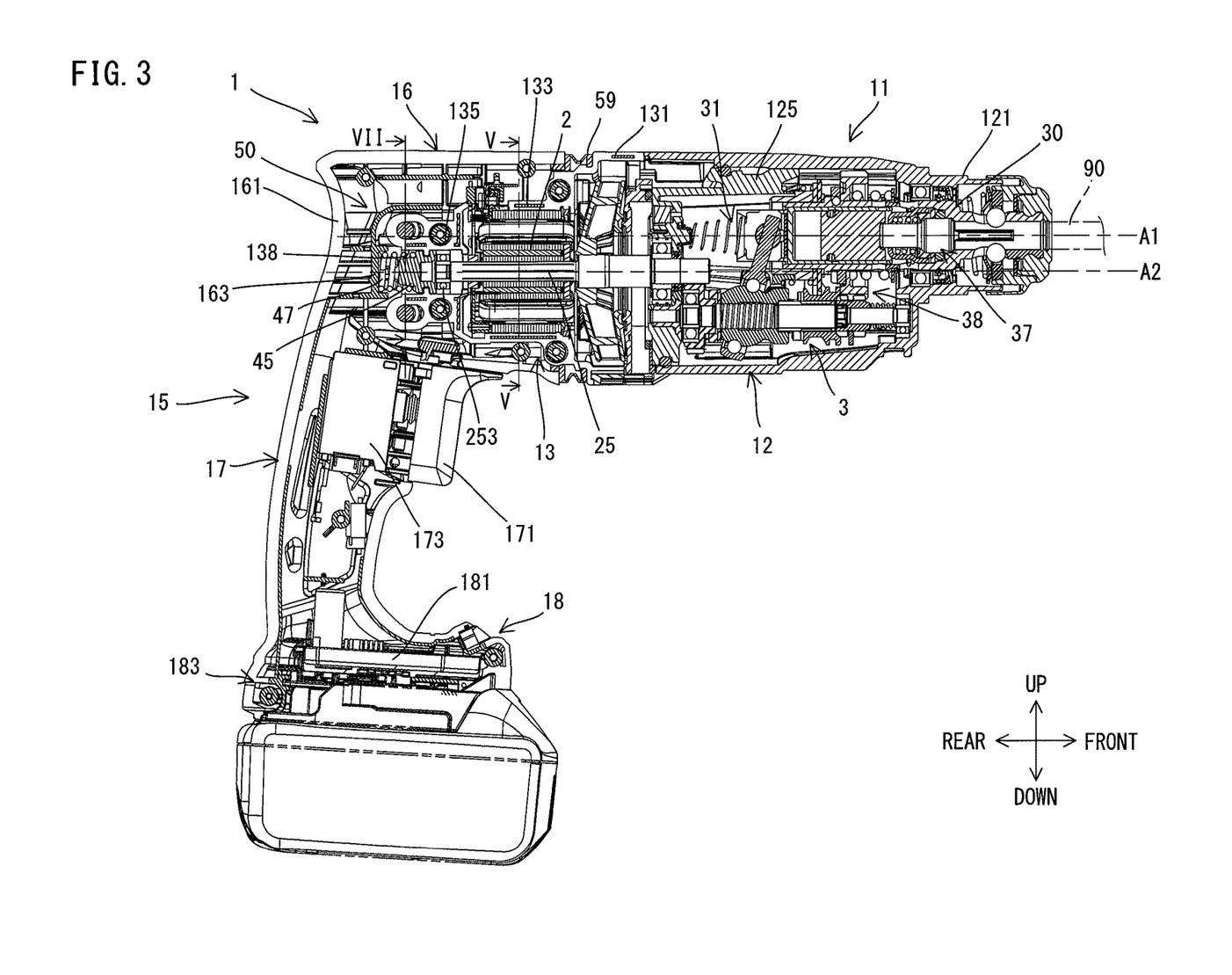
FIG. 3 is a longitudinal section of the hammer drill.

As shown in FIG. 3, in this embodiment, the body housing 11 includes a gear housing 12 and a motor housing 13. The gear housing 12 mainly houses a driving mechanism 3. The motor housing 13 mainly houses a motor 2. The gear housing 12 and the motor housing 13 having their respective internal mechanisms mounted therein are fixedly connected together in the front-rear direction with screws (not shown), with the motor housing 13 arranged on the rear side of the gear housing 12. The gear housing 12 and the motor housing 13 are fixedly connected in an immovable manner relative to each other, to form the body housing 11 as a single housing.

Figure 2:
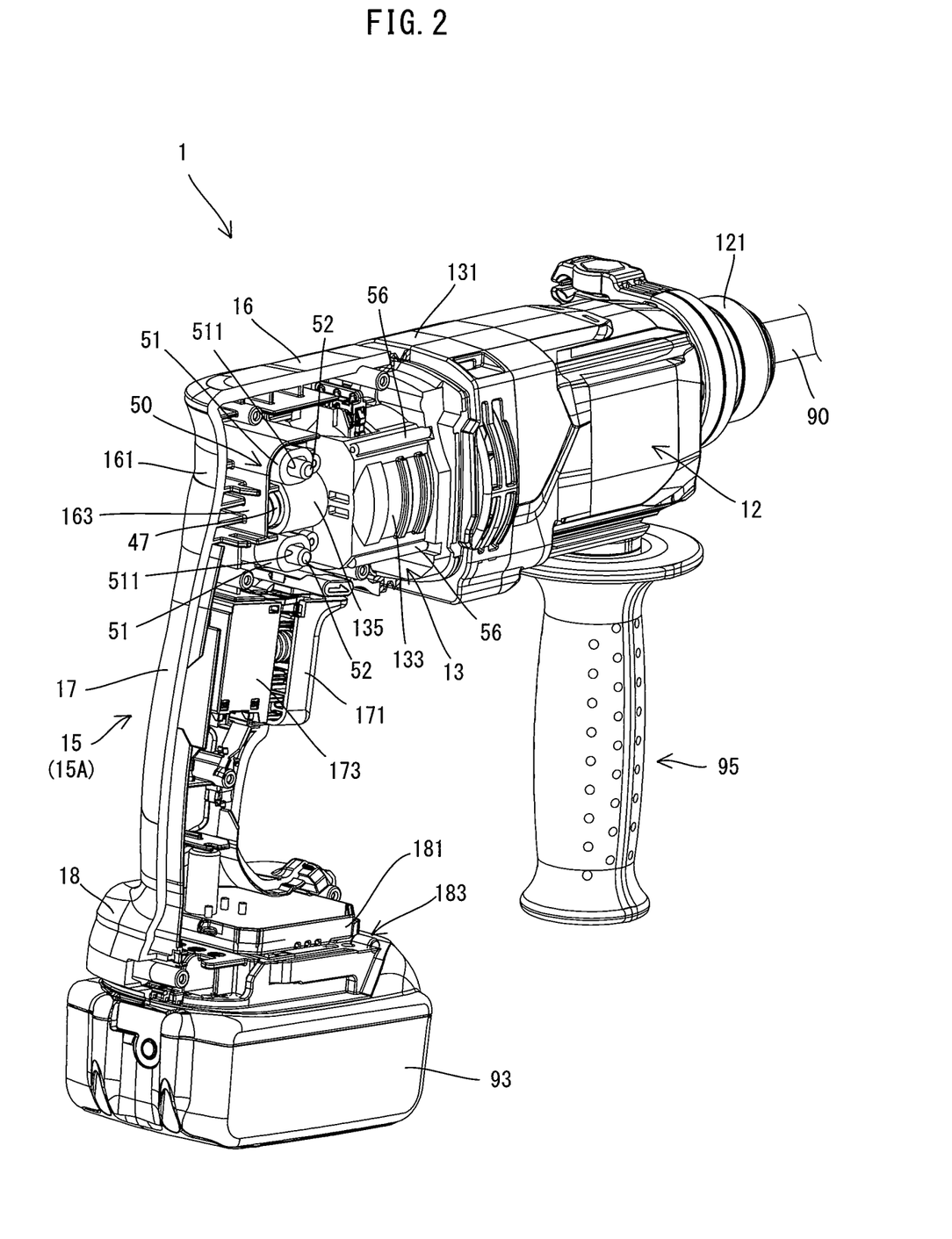
FIG. 2 is a perspective view showing the hammer drill with the auxiliary handle mounted thereto, in a state in which a right half of a handle housing is removed.

The gear housing 12 and its internal structure are now described. As shown in FIGS. 1 to 3, the gear housing 12 as a whole is formed as an elongate cylindrical body extending in the front-rear direction along the driving axis A1. In this embodiment, the gear housing 12 has a circular cylindrical barrel 121 in its front end portion, while a remaining portion on the rear side of the barrel 121 has a generally rectangular section. The tool holder 30 (see FIG. 3) and the driving mechanism 3 are housed in the gear housing 12. The tool holder 30 is disposed within the barrel 121. The tool holder 30 is configured to hold the tool accessory 90 (see FIG. 1) such that the tool accessory 90 can move in the front-rear direction (the driving axis A1 direction) and cannot rotate around the driving axis A1. In this embodiment, the driving mechanism 3 includes a motion converting mechanism 31, a striking mechanism 37 and a rotation transmitting mechanism 38. Further, in this embodiment, the driving mechanism 3 is supported by a metal support 125 and fixedly held within the gear housing 12.

Figure 4:
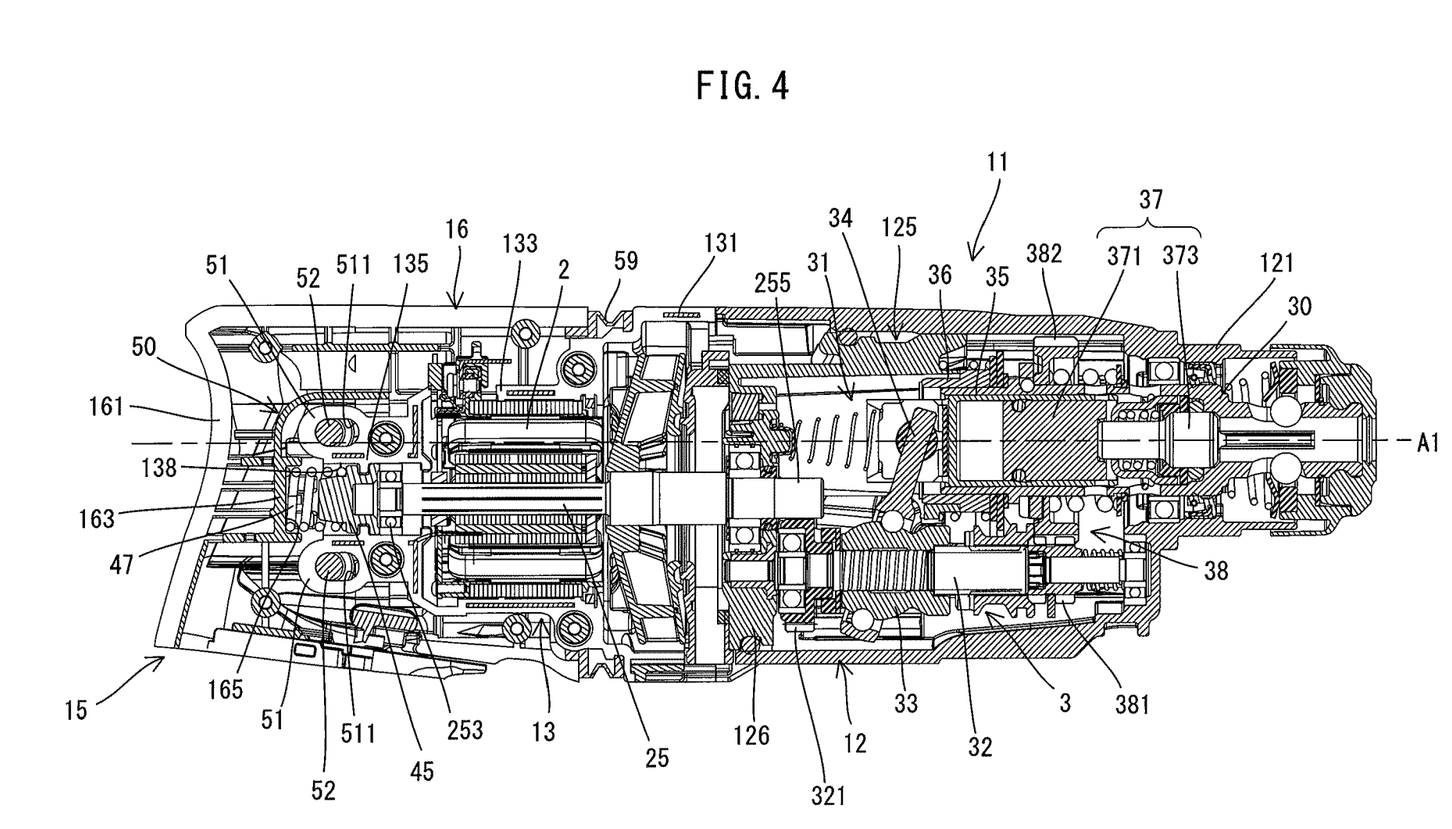
FIG. 4 is a partly enlarged view of FIG. 3 in a state in which the handle housing is in a rearmost position.

As shown in FIG. 4, the motion converting mechanism 31 is configured to convert a rotation of the motor 2 into a linear motion and to transmit it to the striking mechanism 37. In this embodiment, the motion converting mechanism 31 includes an intermediate shaft 32, a rotary body 33, a swinging member 34 and a piston cylinder 35. The intermediate shaft 32 extends in the front-rear direction in parallel to a motor shaft 25 described below. The intermediate shaft 32 is rotatably supported at its front and rear end portions via two bearings held by the gear housing 12. The rotary body 33 is mounted on the intermediate shaft 32. The swinging member 34 is mounted on the rotary body 33 and caused to swing in the front-rear direction along with a rotation of the rotary body 33. The piston cylinder 35 has a bottomed circular cylindrical shape. The piston cylinder 35 is held within a circular cylindrical cylinder 36 so as to be movable in the front-rear direction. The piston cylinder 35 is reciprocated in the front-rear direction along with a swinging movement of the swinging member 34. Further, the cylinder 36 is coaxially and integrally connected to a rear portion of the tool holder 30. The tool holder 30 and the cylinder 36 which are integrally connected together are rotatably supported via two bearings held by the gear housing 12.

The striking mechanism 37 is configured to linearly move and strike the tool accessory 90 (see FIG. 1) so as to linearly drive the tool accessory 90 along the driving axis A1. In this embodiment, the striking mechanism 37 includes a striking element in the form of a striker 371 and an impact bolt 373. The striker 371 is disposed within the piston cylinder 35 so as to be slidable in the front-rear direction. The impact bolt 373, with which the striker 371 collides, is disposed in front of the striker 371. Further, a space behind the striker 371 within the piston cylinder 35 is defined as an air chamber which functions as an air spring.

When the motor 2 is driven and the piston cylinder 35 is moved forward, air within the air chamber is compressed and the internal pressure increases. Therefore, the striker 371 is pushed forward at high speed and then collides with the impact bolt 373, so that the kinetic energy is transmitted to the tool accessory 90. As a result, the tool accessory 90 is linearly driven along the driving axis A1 and strikes a workpiece. When the piston cylinder 35 is moved rearward, the air within the air chamber expands and the internal pressure decreases, so that the striker 371 is retracted rearward. At this time, the tool accessory 90 is pressed against the workpiece and moved back rearward. The motion converting mechanism 31 and the striking mechanism 37 perform the hammering operation by repeating the above-described operation.

The rotation transmitting mechanism 38 is configured to transmit rotating power of the motor shaft 25 to the tool holder 30. The rotation transmitting mechanism 38 is configured as a gear speed reducing mechanism having a plurality of gears, including a first gear 381 which is provided on a front end portion of the intermediate shaft 32 and a second gear 382 which is provided on an outer periphery of the cylinder 36 and engages with the first gear 381. When the motor 2 is driven, the cylinder 36 and the tool holder 30 connected to the cylinder 36 rotate together around the driving axis A1 via the rotation transmitting mechanism 38, so that the tool accessory 90 held by the tool holder 30 is rotationally driven around the driving axis A1. The rotation transmitting mechanism 38 performs the drilling operation as described above.

The hammer drill 1 of this embodiment is configured such that either one of three operation modes, that is, a hammer drill mode, a hammer mode and a drill mode, can be selected by operating a mode switching dial (not shown). In the hammer drill mode, the motion converting mechanism 31 and the rotation transmitting mechanism 38 are driven, so that the hammering operation and the drilling operation are performed. In the hammer mode, power transmission in the rotation transmitting mechanism 38 is interrupted and only the motion converting mechanism 31 is driven, so that only the hammering operation is performed. In the drill mode, power transmission in the motion converting mechanism 31 is interrupted and only the rotation transmitting mechanism 38 is driven, so that only the drilling operation is performed. A mode switching mechanism which operates in response to an operation of the mode switching dial is provided in the gear housing 12. However, the structure itself of the mode switching mechanism is well known and is therefore not described here.

The motor housing 13 and its internal structure are now described. As shown in FIGS. 2 and 3, the motor housing 13 as a whole is formed as an elongate cylindrical body extending in the front-rear direction. The motor housing 13 includes a front end part 131, a central part 133 and a rear end part 135. The motor 2 is housed within the motor housing 13 such that a rotation axis A2 of the motor shaft 25 extends in the front-rear direction, in parallel to the driving axis A1. In this embodiment, a compact and high-output brushless motor is employed as the motor 2.

Figure 5:
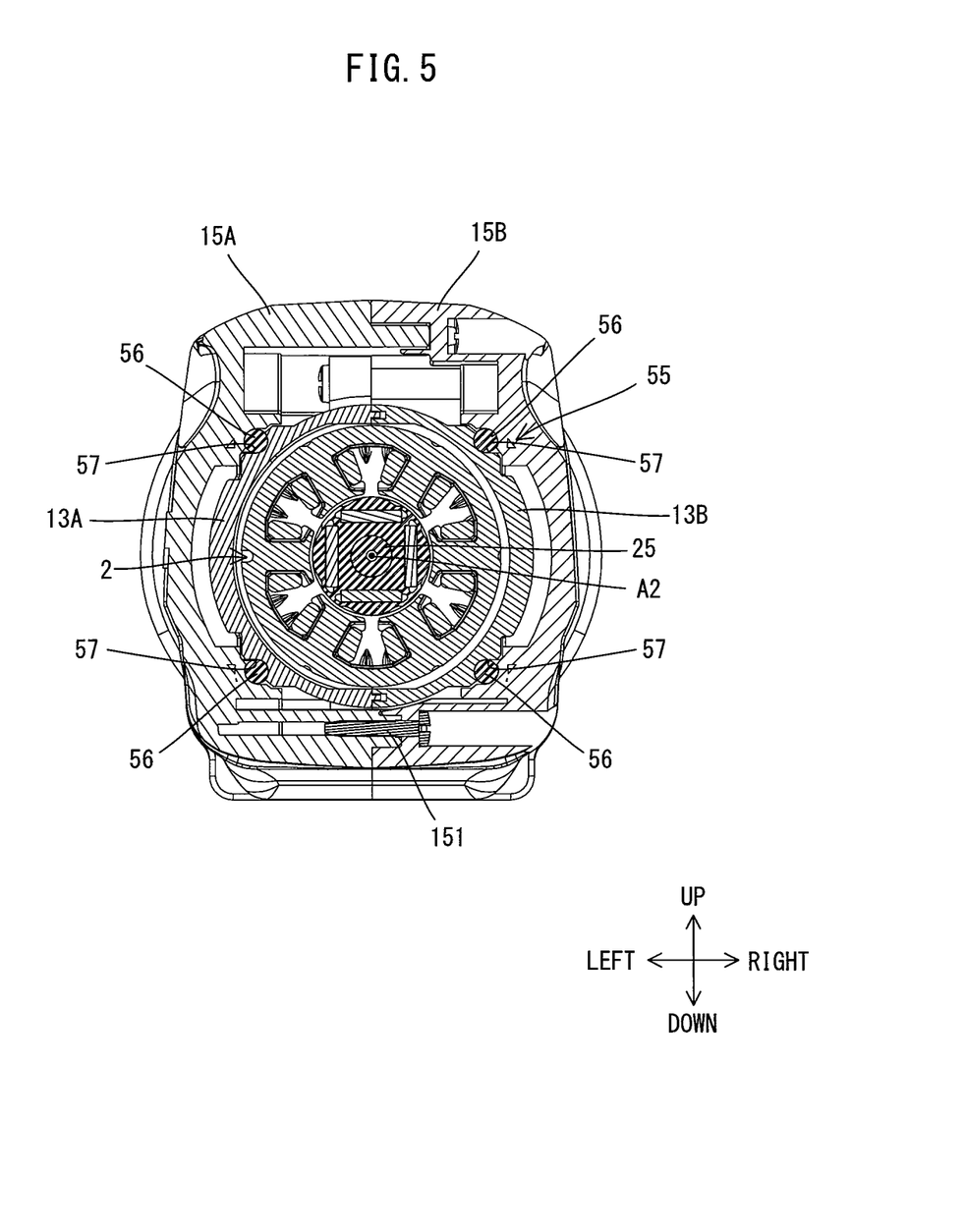
FIG. 5 is a sectional view taken along line VI-VI in FIG. 3.

As shown in FIG. 5, in this embodiment, the motor housing 13 is formed by fixedly connecting right and left halves 13A and 13B in the left-right direction with a plurality of screws (not shown). The halves 13A and 13B correspond to left and right two halves divided along the rotation axis A2 of the motor shaft 25. Thus, the motor housing 13 is formed as a single housing by connecting the two halves 13A and 13B in the left-right direction.

Figure 6:
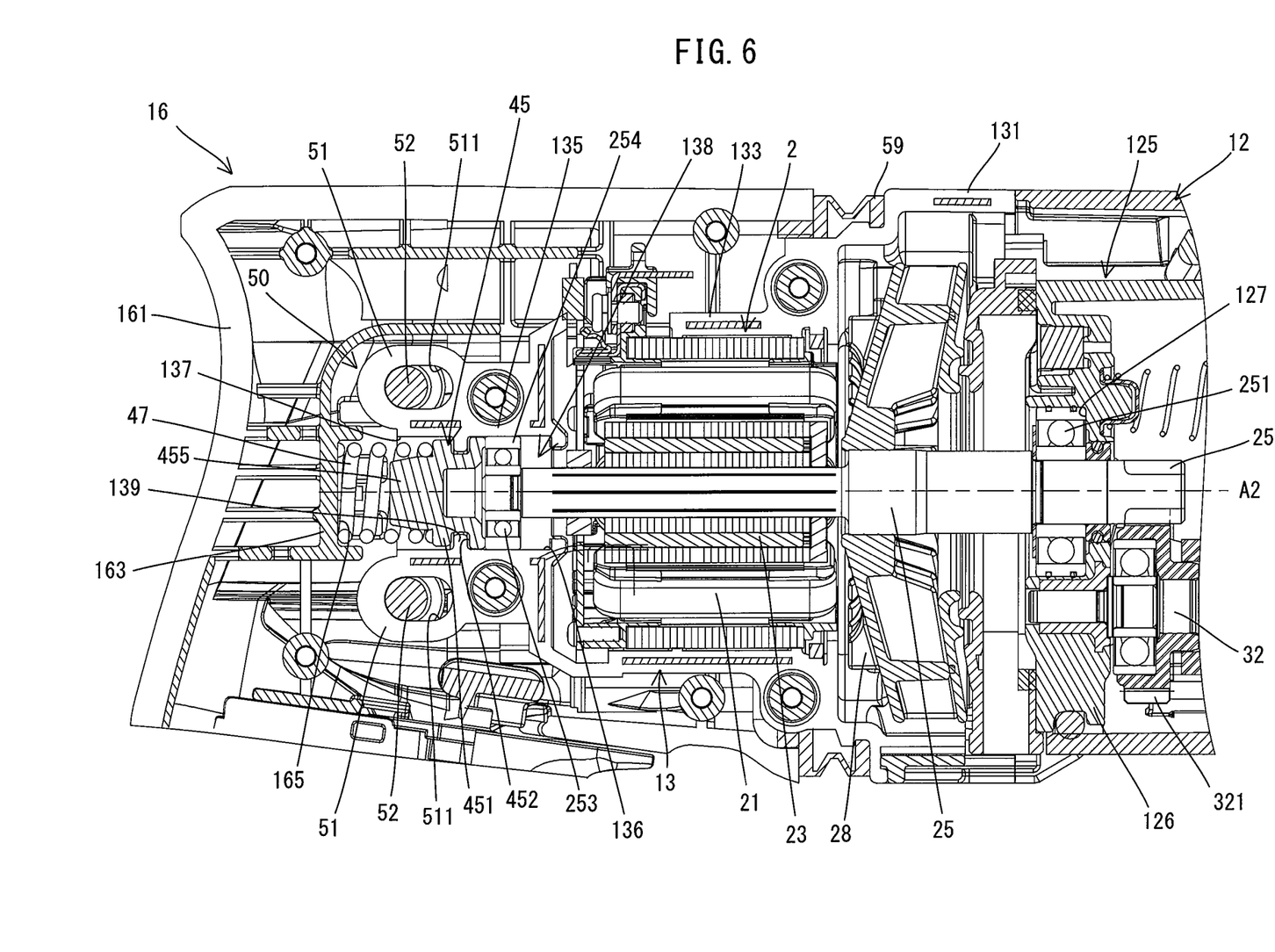
FIG. 6 is a partly enlarged view of FIG. 3.

As shown in FIGS. 2 and 6, in this embodiment, the front end part 131 of the motor housing 13 which is connected to the gear housing 12 has a rectangular section, corresponding to the shape of the gear housing 12. A fan 28 fixed onto the motor shaft 25 is disposed within the front end part 131. The fan 28 is configured to rotate together with the motor shaft 25 so as to generate an air flow for cooling the motor 2. The central part 133 houses a stator 21 and a rotor 23 which form a body of the motor 2. The central part 133 has a generally circular cylindrical shape, corresponding to the body of the motor 2, and has a smaller diameter than the front end part 131. In the rear end part 135 is disposed a rear end portion of the motor shaft 25. More specifically, the rear end part 135 is configured as a part that houses a bearing 235 for supporting the rear end portion of the motor shaft 25. The rear end part 135 as a whole has a circular cylindrical shape, corresponding to the bearing 253, and has a smaller diameter than the central part 133.

The front end part 131 of the motor housing 13 is fixed to the gear housing 12 and exposed to the outside, while the central part 133 and the rear end part 135 are covered with the covering part 16 of the handle housing 15. The central part 133, the rear end part 135 and their respective internal structures will be described later in detail.

The handle housing 15 and its internal structure are now described. As shown in FIGS. 2 and 3, the handle housing 15 as a whole is formed as an elongate cylindrical body that generally extends in the up-down direction. As shown in FIGS. 2 and 5, in this embodiment, like the motor housing 13, the handle housing 15 is formed by fixedly connecting right and left halves 15A and 15B in the left-right direction with a plurality of screws 151. The halves 15A and 15B correspond to left and right two halves divided along the rotation axis A2 of the motor shaft 25. Thus, the handle housing 15 is formed as a single housing by connecting the two halves 15A and 15B in the left-right direction.

As shown in FIGS. 2 and 3, in this embodiment, the covering part 16 which forms an upper portion of the handle housing 15 has a bottomed cylindrical shape, having an open front end and a closed rear end. The rear end of the covering part 16 is closed by a rear end outer wall 161. The central part 133 and the rear end part 135 of the motor housing 13 are disposed within the covering part 16. Further, the covering part 16 and its internal structure will be described later in detail.

The grip part 17, which forms an intermediate portion of the handle housing 15, has an elongate cylindrical shape and protrudes downward from the rear end portion of the covering part 16. A trigger 171 is disposed on a front side of an upper end portion of the grip part 17 and configured to be pulled by a user. A switch 173 is housed within the grip part 17 and configured to be normally held in an off-state and to be turned on in response to a pulling operation of the trigger 171.

A lower end part 18 of the handle housing 15 which is connected to a lower end of the grip part 17 has a rectangular box-like shape as a whole. The lower end part 18 houses a controller 181 for controlling driving of the motor 2. The controller 181 is configured to drive the motor 2 when the switch 173 is turned on. Further, a battery mounting part 183 is provided on a lower end portion of the lower end part 18. The battery mounting part 183 is configured such that a battery 93 as a power source can be removably attached thereto.

In this embodiment, the motor housing 13 (specifically, the central part 133 and the rear end part 135) and the covering part 16 have a structure for preventing a backlash (looseness) of the motor shaft 25 in the axial direction, as well as a structure for reducing transmission of vibration to the handle housing 15. More specifically, as the structure for preventing the backlash of the motor shaft 25 in the axial direction, a spring member 47 is interposed between the rear end portion of the motor shaft 25 and an inner wall surface of the covering part 16. Further, as the structure for reducing the transmission of vibration to the handle housing 15, the handle housing 15 and the body housing 11 are elastically connected with each other via the spring member 47 so as to be movable in the front-rear direction relative to each other. These structures are now described below in detail.

First, a guide structure for guiding a movement of the handle housing 15 relative to the body housing 11 in the front-rear direction is explained. In this embodiment, a first guide mechanism 50 (see FIG. 6) is provided in the rear end part 135 of the motor housing 13 and the covering part 16 of the handle housing 15. In addition, a second guide mechanism 55 (see FIG. 5) is provided in the central part 133 and the covering part 16.

Figure 7:
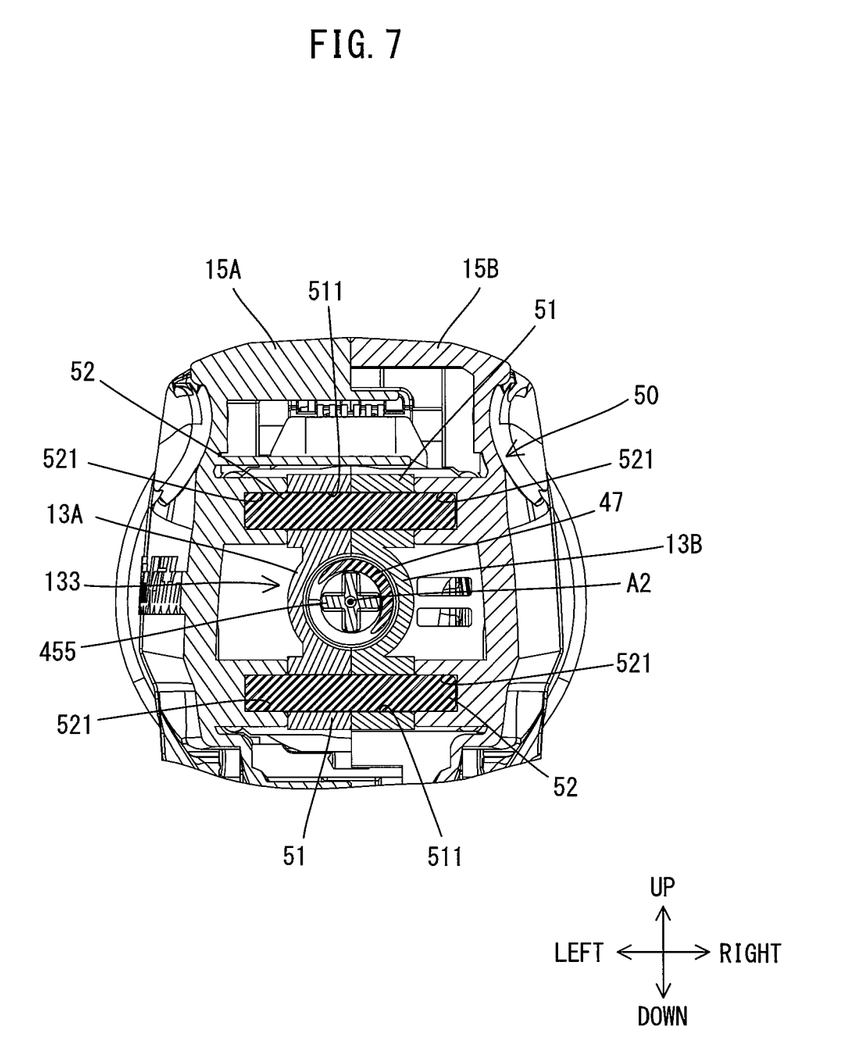
FIG. 7 is a sectional view taken along line VII-VII in FIG. 3.

As shown in FIGS. 2, 6 and 7, the first guide mechanism 50 includes a guide hole 511 formed in the rear end part 135 and a guide rod 52 provided in the covering part 16. More specifically, a guide part 51 having the guide hole 511 is provided in each of upper and lower end portions of the rear end part 135. The guide hole 511 is an elongate hole that is longer in the front-rear direction and that has a certain width in the up-down direction. The guide hole 511 extends through the motor housing 13 in the left-right direction. The guide rod 52 having a columnar shape extends in the left-right direction in the covering part 16. A central part of the guide rod 52 is inserted through the guide hole 511 and right and left end portions of the guide rod 52 are fitted in a pair of right and left fitting recesses 521 formed in the inner wall surface of the covering part 16, so that the guide rod 52 is fixed to the handle housing 15. Further, the guide rod 52 has a diameter generally equal to the width of the guide hole 511 in the up-down direction and can slide in the front-rear direction within the guide hole 511. In this embodiment, the guide rod 52 is made of metal.

With the first guide mechanism 50 having such a structure, the handle housing 15 can move in the front-rear direction relative to the motor housing 13 (the body housing 11) between a rearmost position (shown in FIG. 4), in which the guide rod 52 is in contact with a rear end of the guide hole 511, and a frontmost position (shown in FIG. 8), in which the guide rod 52 is in contact with a front end of the guide hole 511. The first guide mechanism 50 (the guide hole 511 and the guide rod 52) is thus configured to guide the movement of the handle housing 15 relative to the motor housing 13 (the body housing 11) in the front-rear direction and to define a movable range (the rearmost position and the frontmost position) of the handle housing 15.

As shown in FIGS. 2 and 5, the second guide mechanism 55 includes a guide pin 56 provided on the central part 133 and a guide recess 57 formed in the covering part 16. More specifically, the guide pin 56 is held on an outer circumferential surface of the central part 133 so as to extend in the front-rear direction. It is noted that four such guide pins 56 are arranged in a balanced manner on a left upper end, a left lower end, a right upper end and a right lower end of the central part 133 in the circumferential direction around the rotation axis A2. The guide recess 57 is formed in the inner wall surface of the covering part 16. The guide recess 57 is engaged with the guide pin 56 formed as a protrusion protruding from the outer circumferential surface of the central part 133. With the second guide mechanism 55 having such a structure, the handle housing 15 can slide relative to the motor housing 13 in the front-rear direction while the guide recesses 57 are engaged with the guide pins 56. In this embodiment, the guide pins 56 are made of metal.

Figure 8:
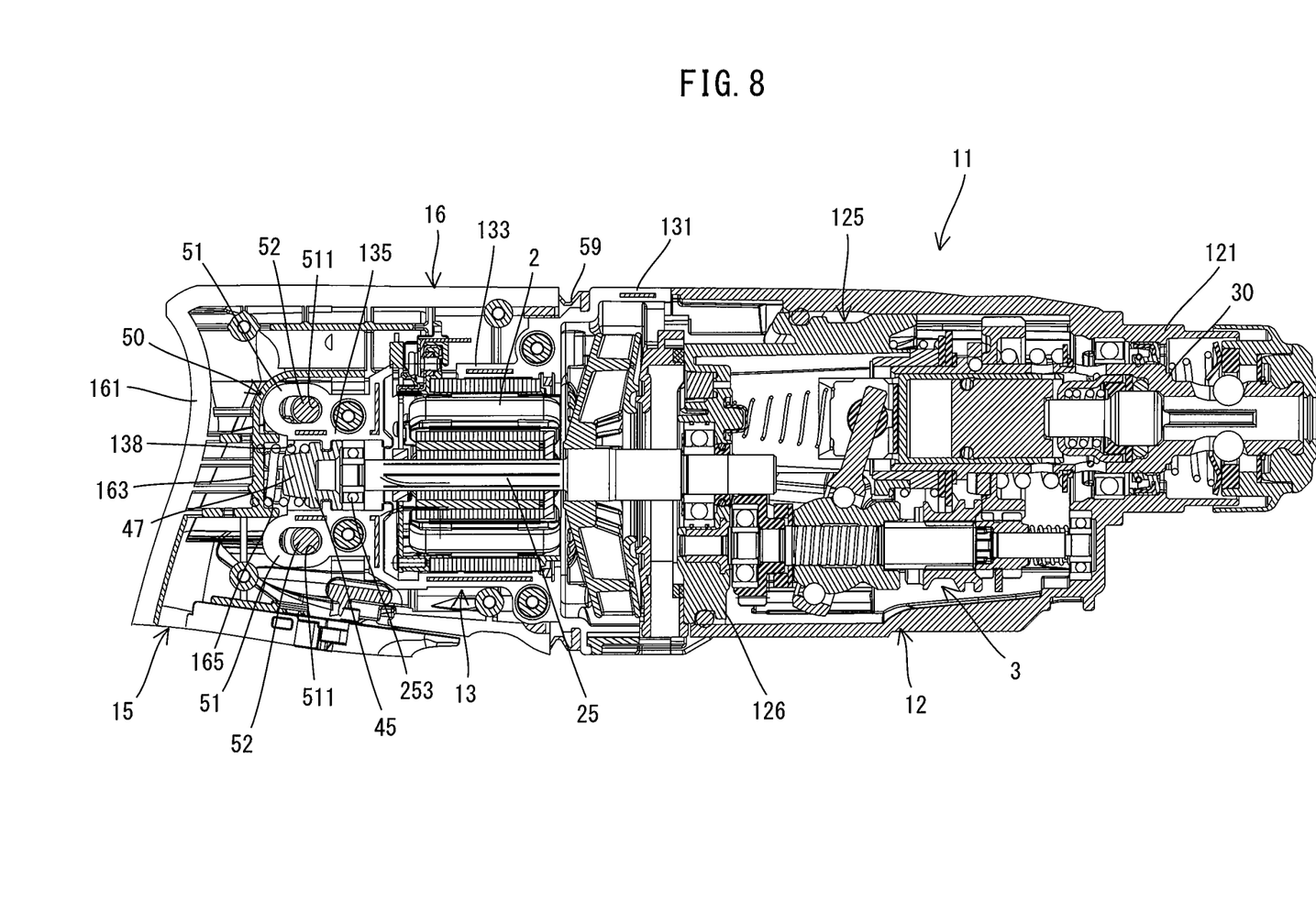
FIG. 8 is a partly enlarged view corresponding to FIG. 4 in a state in which the handle housing is in a frontmost position.

As shown in FIGS. 4 and 8, a bellows 59 is disposed between a rear end of an outer periphery of the front end part 131 and a front end of the covering part 16. The bellows 59 is extensible and compressible in the front-rear direction. The bellows 59 can prevent dust from entering between the front end part 131 and the covering part 16, while extending and compressing along with the movement of the handle housing 15 relative to the motor housing 13 in the front-rear direction.

A structure of elastically connecting the handle housing 15 to the body housing 11 is now explained. In this embodiment, the body housing 11 and the handle housing 15 are connected together via the spring member 47 (see FIG. 6) so as to be movable relative to each other in the front-rear direction. Further, in this embodiment, the spring member 47 also serves as the structure for preventing a backlash (looseness) of the motor shaft 25 in the axial direction.

A structure of supporting the motor 2 housed in the motor housing 13 is now explained. As shown in FIG. 6, in this embodiment, the motor shaft 25 is supported by bearings 251, 253 so as to be rotatable around the rotation axis A2. More specifically, front and rear end portions of the motor shaft 25 are rotatably supported by the bearings 251, 253, respectively. In this embodiment, a rolling bearing (specifically, a ball bearing) is employed as each of the bearings 251, 253.

The front bearing 251 is held by the support 125, which is fixedly held by the gear housing 12. More specifically, the bearing 251 is fitted from the rear into a recess 127 which is formed in a rear wall 126 of the support 125. Further, the front end portion of the motor shaft 25 protrudes forward from the bearing 251 into the gear housing 12. A driving gear 255 is provided on this protruding part and engages with a driven gear 321 provided on a rear end portion of the intermediate shaft 32. Rotation of the motor shaft 25 is transmitted to the intermediate shaft 32 via the driving gear 255 and the driven gear 321. The rear bearing 253 is fitted from the front into the rear end part 135 of the motor housing 13. As described above, in this embodiment, the front and rear bearings 251, 253 are respectively held by the gear housing 12 and the motor housing 13 which are separately formed and fixedly connected together.

As shown in FIGS. 2 and 6, the rear end part 135 of the motor housing 13 has a circular cylindrical shape. The rear end part 135 has an opening part 138 provided on the rear side of the rear end portion of the motor shaft 25. In this embodiment, the opening part 138 is formed as a through-hole extending along the rotation axis A2, from a front end opening 136 to a rear end opening 137 of the rear end part 135. Further, the rear end part 135 has an annular projection 139 annularly protruding radially inward from the inner circumferential surface of the rear end part 135. The annular projection 139 is provided in the central portion of the rear end part 135 in the front-rear direction. The bearing 253 is fitted in the opening part 138, in front of the annular projection 139. An intervening member 45 is disposed on the rear side of the bearing 253.

The intervening member 45 includes a front-side portion and a rear-side portion which respectively form a bearing contact part 451 and a spring receiving part 455.

The bearing contact part 451 is a portion that is in contact with the bearing 253 within the rear end part 135. In this embodiment, the bearing contact part 451 has a circular cylindrical shape having an outer diameter slightly smaller than the inner diameter of the rear end part 135. A front end portion of the bearing contact part 451 has an annular shape generally corresponding to an outer ring 254 of the bearing 253, and comes in contact with the outer ring 254 when the intervening member 45 is biased forward. Further, an annular groove 452 is formed all around the outer periphery of the bearing contact part 451. The intervening member 45 is disposed within the opening part 138 in a state in which the annular projection 139 is engaged in the annular groove 452. Thus, the intervening member 45 is positioned relative to the rear end part 135 in the front-rear direction. It is noted that the width of the annular groove 452 in the front-rear direction is slightly larger than the width of the annular projection 139 in the front-rear direction.

The spring receiving part 455 is a portion configured to be engaged with one end portion of the spring member 47 described below. In this embodiment, the spring receiving part 455 is formed as a projection protruding rearward from the rear end of the bearing contact part 451. The spring receiving part 455 has a diameter which is smaller than the bearing contact part 451 and slightly decreases toward the rear.

As shown in FIGS. 2 and 6, the covering part 16 has a spring support wall 163 in front of the rear end outer wall 161, which defines the rear end of the hammer drill 1. The spring support wall 163 extends in a direction perpendicular to the rotation axis A2. The spring support wall 163 is disposed behind the rear end part 135 so as to face the opening part 138 (the rear end opening 137). Further, the spring support wall 163 has a recess 165 which is defined by ribs protruding forward from a front surface of the spring support wall 163. The recess 165 is positioned to face the spring receiving part 455 through the rear end opening 137. The recess 165 is configured to be engaged with the other end portion of the spring member 47.

In this embodiment, a compression coil spring for isolating vibration is employed as the spring member 47. The spring member 47 is interposed between the front surface of the spring support wall 163 (in other words, an inner wall surface of the covering part 16) and the rear end portion of the motor shaft 25. More specifically, one end portion of the spring member 47 is inserted into the opening part 138 through the rear end opening 137 of the rear end part 135, and fitted onto the spring receiving part 455 of the intervening member 45. It is noted that the diameter of a base end portion of the spring receiving part 455 is slightly larger than the diameter of the spring member 47, so that the spring member 47 is lightly press-fitted onto the spring receiving part 455. The other end portion of the spring member 47 is fitted in the recess 165 of the spring support wall 163 and supported by the spring support wall 163. Further, as described above, the movable range of the handle housing 15 relative to the motor housing 13 in the front-rear direction is defined by the guide hole 511 and the guide rod 52. The spring member 47 is always compressed between the spring support wall 163 and the intervening member 45 and biases the spring support wall 163 and the intervening member 45, through the opening part 138, away from each other in the front-rear direction, wherever the handle housing 15 is located within the movable range. Thus, the handle housing 15 is normally biased rearward relative to the body housing 11 by the elastic force of the spring member 47 and held in the rearmost position shown in FIG. 4.

By biasing the intervening member 45 forward, as shown in FIG. 6, the spring member 47 brings the front end of the intervening member 45 into contact with the outer ring 254 of the bearing 253 and biases the motor shaft 25 forward (in other words, in a direction that brings the bearing 251 into contact with the bottom of the recess 127). By thus biasing, the spring member 47 may accommodate dimensional errors and assembling errors of the motor shaft 25, the gear housing 12 and the motor housing 13 and thereby prevent the backlash (looseness) of the motor shaft 25 in the front-rear direction (the axial direction). Further, in this state, a clearance is provided between the annular projection 139 and the annular groove 452 in the front-rear direction. In other words, the intervening member 45 is arranged with a clearance relative to the rear end part 135. The clearance defines an allowable amount of a positional shift (an allowable amount of dimensional errors or assembling errors) of the bearing 253 (the motor shaft 25) relative to the rear end part 135.

A method of assembling the hammer drill 1 in this embodiment is now explained. In order to complete the hammer drill 1, the gear housing 12 and the motor housing having their respective internal mechanisms mounted therein are fixedly connected together in the front-rear direction, and then the handle housing 15 having its internal mechanisms mounted therein is elastically connected to the motor housing 13 so as to be movable in the front-rear direction relative to the motor housing 13.

As described above, the motor housing 13 is formed by connecting the two halves 13A and 13B divided in the left-right direction. Therefore, when assembling the motor housing 13, a worker places the intervening member 45 and the motor 2 having the bearings 251, 253 and the fan 28 fixed onto the motor shaft 25 in one of the halves 13A, 13B, and then covers this half with the other half and fixedly connects the halves 13A, 13B with screws (not shown). With such a halved structure, the intervening member 45 can be easily mounted into the rear end part 135 with the annular projection 139 engaged in the annular groove 452. Further, when the halves 13A, 13B are connected together, through-holes that are respectively provided in the halves 13A, 13B communicate with each other and form the guide hole 511 in the rear end part 135. The penetrating direction of the through-holes corresponds to the direction of dividing the motor housing 13 into the two halves 13A, 13B (the left-right direction), so that the through-holes can be easily formed when the halves 13A, 13B are molded.

A worker then fixedly connects the motor housing 13, in which the internal mechanisms are mounted as described above, to the rear of the gear housing 12 with screws (not shown). At this time, the drive gear 255 of the motor shaft 25 is inserted into the gear housing 12 through a through-hole which is formed in the recess 127 of the rear wall 126 of the support 125, and engaged with the driven gear 321, and the bearing 251 is fitted into the recess 127.

As described above, in this embodiment, like the motor housing 13, the handle housing 15 is also formed by connecting the two halves divided in the left-right direction. The worker mounts the trigger 171, the switch 173 and the controller 181 to one of the halves 15A, 15B. The worker also fits the spring member 47 onto the spring receiving part 455 of the intervening member 45 through the rear end opening 137 of the rear end part 135.

Further, the worker fits the guide rod 52 in the fitting recess 521. The worker further inserts the guide rod 52 through the guide hole 511 of the motor housing 13, and positions the one of the halves 15A, 15B in place while fitting and compressing the rear end of the spring member 47 in contact with the spring support wall 163 in the recess 165. Further, the worker positions the other of the halves 15A, 15B in place while fitting the protruding end (right end) of the guide rod 52 in the fitting recess 521 of the other of the halves 15A, 15B, and then fixedly connects the halves 15A, 15B with the screws 151. With such a halved structure, the handle housing 15 can be easily mounted in the state in which the guide rod 52 protruding in the left-right direction (the direction of dividing the motor housing 13 into the halves 15A, 15B) is inserted through the guide hole 511 and the central part 133 and the rear end part 135 are covered with the covering part 16. Further, when mounting the handle housing 15, the bellows 59 is held between the front end part 131 and the covering part 16.

Operation of the hammer drill 1 in this embodiment is now explained. When the trigger 171 is pulled and the switch 173 is turned on, the controller 181 drives the motor 2. The driving mechanism 3 is then driven by power of the motor 2 according to an operation mode selected with the mode switching dial (not shown). Thus, the tool accessory 90 held by the tool holder 30 is driven, and the processing operation is performed. During operation, vibration is caused in the body housing 11. When the motion converting mechanism 31 and the striking mechanism 37 are driven to perform the hammering operation in the hammer mode or hammer drill mode, in particular, vibration is caused mainly in the direction of the driving axis A1 (the front-rear direction) in the body housing 11 by the hammering force of the tool accessory 90 and the reaction force from the workpiece.

In this embodiment, the spring member 47, which is interposed between the rear end portion of the motor shaft 25 and the spring support wall 163, elastically connects the handle housing 15 to the body housing 11, such that the handle housing 15 is relatively movable in the front-rear direction between the rearmost position shown in FIG. 4 and the frontmost position shown in FIG. 8. Therefore, transmission of vibration from the body housing 11 to the grip part 17 of the handle housing 15 can be effectively reduced by the elastic force of the spring member 47.

Further, in this embodiment, the first and second guide mechanisms 50, 55 for guiding the movement of the handle housing 15 relative to the body housing 11 in the front-rear direction are provided in the motor housing 13 and the covering part 16. In the first guide mechanism 50, two sets of the guide hole 511 and the guide rod 52, which are respectively arranged above and below the spring member 47, can stably guide the relative movement, along with extension and compression of the spring member 47. Further, the first guide mechanism 50 can define the movable range of the handle housing 15 relative to the body housing 11. In the second guide mechanism 55, the guide pins 56 are provided at a plurality of places in the circumferential direction on the outer circumferential surface of the central part 133 of the motor housing 13, and the guide recesses 57 are formed in the inner wall surface of the covering part 16 and engage and slide relative to the guide pins 56, so that the stability of the relative movement can be improved.

As described above, in the hammer drill 1 according to this embodiment, the spring member 47 is interposed between the rear end portion of the motor shaft 25 supported by the body housing 11 and the front side surface of the spring support wall 163 of the covering part 16 (the inner wall surface of the covering part 16) and biases the motor shaft 25 forward through the opening part 138. With such a structure, whether the motor housing 13 is formed by connecting the halves 13A, 13B like in this embodiment, or cylindrically formed in one piece, the spring member 47 can be easily mounted. In this embodiment, in particular, having the motor housing 13 formed by connecting the halves 13A, 13B, not only the spring member 47 but also the motor 2, the bearing 253 and the intervening member 45 can be easily mounted. Further, by the elastic force of the spring member 47, dimensional errors and assembling errors of the motor shaft 25 and the body housing 11 (the gear housing 12 and the motor housing 13) can be accommodated so that the backlash of the motor shaft 25 in the front-rear direction (the axial direction) can be prevented. Thus, in the hammer drill 1 according to this embodiment, a rational structure for preventing the backlash of the motor shaft 25 can be realized.

Further, in this embodiment, both of the function of preventing the backlash of the motor shaft 25 and the function of reducing vibration of the handle housing 15 can be realized with the same spring member 47, so that size increase can be avoided. Further, in order to realize the both functions, in this embodiment, a compression coil spring for isolating vibration is employed as the spring member 47. Compared with a wave washer which may be often used to prevent the backlash of the motor shaft 2, the compression coil spring for isolating vibration has a larger elastic modulus and is therefore capable of more reliably preventing such a backlash.

Further, in this embodiment, the intervening member 45 is arranged to be in contact with the bearing 253 (specifically, the outer ring 254) which rotatably supports the rear end portion of the motor shaft 25, and the front end portion of the spring member 47. Therefore, compared with a structure in which the spring member 47 is arranged in direct contact with the rear end portion of the motor shaft 25, assembling can be facilitated. Further, the intervening member 45 can prevent entry of dust into the motor housing 13. Furthermore, the intervening member 45 is arranged with a clearance between the annular groove 452 and the annular projection 139 in the front-rear direction, and engaged with the spring member 47 via the spring receiving part 455. With this structure, the spring member 47 can be stably held while the allowable amount of dimensional errors or assembling errors is defined.

The above-described embodiment is a mere example of the invention and a power tool according to the present invention is not limited to the structure of the hammer drill 1 of the above-described embodiment. For example, the following modifications may be made. Further, one or more of these modifications may be used in combination with the hammer drill 1 of the above-described embodiment or the claimed invention.

In the above-described embodiment, the hammer drill 1 is described as an example of the power tool configured to linearly reciprocate the tool accessory 90, but the present invention may also be applied to other power tools such as an electric hammer and a reciprocating saw. The structures of the motor 2, the driving mechanism 3, the body housing 11 for housing the motor 2 and the driving mechanism 3, and the handle housing 15 having the grip part 17 may also be appropriately changed or modified according to the power tool.

In the above-described embodiment, the gear housing 12 and the motor housing 13 are separately formed and connected together in the front-rear direction to form the body housing 11. The front bearing 251 of the motor shaft 25 is held by the gear housing 12 (the rear wall 126), and the rear bearing 253 of the motor shaft 25 is held by the motor housing 13. In such a structure, a backlash of the motor shaft 25 in the front-rear direction (axial direction) is likely to occur, due to dimensional errors and assembling errors of the motor shaft 25, the gear housing 12 and the motor housing 13. Therefore, the backlash prevention structure using the spring member 47 is especially effective. The body housing 11 may, however, be formed by connecting two halves of the body housing 11 divided in the left-right direction while being formed integrally without a seam in the front-rear direction. Further, the motor housing 13 may be formed in an integral cylindrical form or by connecting two halves divided in the up-down direction.

In the above-described embodiment, the spring member 47 realizes the vibration isolating function by elastically connecting the handle housing 15 and the body housing 11 such that the housings can move relative to each other in the front-rear direction. The handle housing 15 may, however, be connected so as not to be movable in the front-rear direction relative to the body housing 11. In this case, the spring member 47 can still realize the function of preventing the backlash of the motor shaft 25. Further, in either case, an elastic member (such as spring, rubber and synthetic resin) having an elastic modulus suitable for the backlash prevention or vibration isolation may be employed in place of the spring member 47.

The structure of the intervening member 45 disposed between the spring member 47 and the bearing 253 may be appropriately changed or modified. For example, the intervening member 45 does not need to have the annular groove 452 in which the annular projection 139 is engaged. In this case, the intervening member 45 may be slidably arranged in the opening part 138. Further, the intervening member 45 may be configured to protrude rearward from the rear end opening 137. In this case, the spring member 47 may be disposed between the intervening member 45 and the spring support wall 163 outside (on the rear side of) the rear end part 135. Further, the intervening member 45 may be omitted. Specifically, the front end portion of the spring member 47 may be arranged in direct contact with the bearing 253 (the outer ring 254) or the rear end portion of the motor shaft 25.

The guide structure for guiding the movement of the handle housing 15 relative to the body housing 11 may be appropriately changed or modified. For example, in the first guide mechanism 50, the guide hole 511 in the form of an elongate hole is provided in the motor housing 13, and the guide rod 52 in the form of a projection is provided in the covering part 16. On the contrary, however, at least one elongate hole which has a depth in the left-right direction and which is longer in the front-rear direction may be provided in the covering part 16, while at least one projection which protrudes to the left and/or right and is disposed in the elongate hole may be provided in the motor housing 13. Further, the projection does not necessarily need to extend through the elongate hole. The elongate hole may be a bottomed recess and not a through-hole. Further, in the above-described embodiment, the guide rod 52 in the form of the projection is formed separately from the covering part 16, but the projection may be integrally formed with the covering part 16 or the motor housing 13.

Likewise, in the second guide mechanism 55, the guide pin 56 may be provided on the inner wall surface of the covering part 16, and the guide recess 57 may be provided on the outer circumferential surface of the motor housing 13. Further, the numbers and the arrangement positions of the guide pins 56 and the guide recesses 57 may be appropriately changed. Further, only either one of the first guide mechanism 50 and the second guide mechanism 55 may be provided. In a structure having only the second guide mechanism 55, it may be preferable that a structure for defining the movable range of the handle housing 15 relative to the body housing 11 is provided in the motor housing 13 or the covering part 16.

Correspondences between the features of the embodiments and the modifications and the features of the invention are as follow. The hammer drill 1 is an example that corresponds to the "power tool" according to the present invention. The driving axis A1 is an example that corresponds to the "driving axis" according to the present invention. The body housing 11 is an example that corresponds to the "tool body" according to the present invention. The motor 2 is an example that corresponds to the "motor" according to the present invention. The motor shaft 25 is an example that corresponds to the "motor shaft" according to the present invention. The driving mechanism 3 (the motion converting mechanism 31 and the striking mechanism 37) is an example that corresponds to the "driving mechanism" according to the present invention. The handle housing 15, the covering part 16, the front side surface of the spring support wall 163 and the grip part 17 are examples that correspond to the "handle part", the "covering part", the "inner wall surface" and the "grip part", respectively, according to the present invention. The spring member 47 is an example that corresponds to the "elastic member" according to the present invention. The opening part 138 extending from the front end opening 136 to the rear end opening 137 is an example that corresponds to the "opening" according to the present invention.

The gear housing 12 and the motor housing 13 are examples that correspond to the "driving mechanism housing part" and the "motor housing part", respectively, according to the present invention. The rotation axis A2 is an example that corresponds to the "rotation axis of the motor shaft" according to the present invention. The halves 13A, 13B which form the motor housing 13 are an example that corresponds to the "two halves" according to the present invention. The bearing 253 is an example that corresponds to the "bearing" according to the present invention. The intervening member 45 and the spring receiving part 455 are examples that correspond to the "intervening member" and the "engagement part", respectively, according to the present invention. The halves 15A, 15B which form the handle housing 15 are an example that corresponds to the "two halves" according to the present invention. The guide rod 52 and the guide hole 511 are examples that correspond to the "projection" and the "guide hole", respectively, according to the present invention.

In view of the nature of the present invention and the above-described embodiment, the following features are provided. One or more of the features can be employed in combination with the hammer drill 1 of the embodiment, its modification, or in combination with the claimed invention.

(Aspect 1)

The driving mechanism housing part and the motor housing part may be separately formed, and the tool body may be formed by connecting the motor housing part to a rear side of the driving mechanism housing part.

(Aspect 2)

The power tool may further include a bearing that is held by the driving mechanism housing part and rotatably supports a front end portion of the motor shaft.

(Aspect 3)

The motor housing part may include a cylindrical part that covers a motor body, the motor body including a stator and a rotor, and the covering part may cover at least the cylindrical part and the rear end part of the motor housing part.

(Aspect 4)

The power tool may have a guide mechanism that includes a first guide element provided in the tool body and a second guide element provided in the covering part, the guide mechanism being configured to guide a movement of the handle part relative to the tool body in the front-rear direction.

The first guide mechanism 50 and the second guide mechanism 55 in the above-described embodiment are examples that correspond to the "guide mechanism" according to this aspect.

(Aspect 5)

The power tool may include a movable-range defining part that defines a movable range of the handle part relative to the tool body in the front-rear direction.

The first guide mechanism 50 (the guide hole 511 and the guide rod 52) in the above-described embodiment is an example that corresponds to the "movable-range defining part" according to this aspect.

(Aspect 6)

The first guide element may be one of a projection and a recess provided on an outer circumferential surface of the cylindrical part, and the second guide element may be one of a recess and a projection provided on an inner wall surface of the covering part and engaged with one of the projection and the recess provided on the outer circumferential surface of the cylindrical part.

DESCRIPTION OF THE NUMERALS

1: hammer drill, 11: body housing, 12: gear housing, 121: barrel, 125: support, 126: rear wall, 127: recess, 13: motor housing, 13A: half, 13B: half, 131: front end part, 133: central part, 135: rear end part, 136: front end opening, 137: rear end opening, 138: opening part, 139: annular projection, 15: handle housing, 15A: half, 15B: half, 151: screw, 16: covering part, 161: rear end outer wall, 163: spring support wall, 165: recess, 17: grip part, 171: trigger, 173: switch, 18: lower end part, 181: controller, 183: battery mounting part, 2: motor, 21: stator, 23: rotor, 25: motor shaft, 251: bearing, 253: bearing, 254: outer ring, 255: driving gear, 28: fan, 3: driving mechanism, 30: tool holder, 31: motion converting mechanism, 32: intermediate shaft, 321: driven gear, 33: rotary body, 34: swinging member, 35: piston cylinder, 36: cylinder, 37: striking mechanism, 371: striker, 373: impact bolt, 38: rotation transmitting mechanism, 381: first gear, 382: second gear, 45: intervening member, 451: bearing contact part, 452: annular groove, 455: spring receiving part, 47: spring member, 50: first guide mechanism, 51: guide part, 511: guide hole, 52: guide rod, 521: fitting recess, 55: second guide mechanism, 56: guide pin, 57: guide recess, 59: bellows, 90: tool accessory, 93: battery, 95: auxiliary handle, A1: driving axis, A2: rotation axis

What is claimed is:

1. A power tool configured to linearly reciprocate a tool accessory along a driving axis extending in a front-rear direction, the power tool comprising:
    a tool body defining an exterior of the power tool and extending along the driving axis in the front-rear direction;
    a motor having a motor shaft, the motor shaft being rotatably supported by the tool body and extending and movable relative to the tool body in the front-rear direction;
    a handle part including a grip part, the grip part extending in a direction crossing the driving axis; and
    an elastic member interposed between a rear end portion of the motor shaft and an inner wall surface of the handle part, wherein:
    the elastic member applies a biasing force to the motor shaft and the handle part that biases the motor shaft and the handle part away from each other in the front-rear direction, without the biasing force being transmitted through the tool body to the motor shaft.

2. The power tool as defined in claim 1, wherein:
    the tool body has a rear end portion, the rear end portion having an opening, and
    the elastic member biases the motor shaft and the handle part away from each other in the front-rear direction through the opening.

3. The power tool as defined in claim 1, further comprising:
    a driving mechanism housed in the tool body and configured to linearly reciprocate the tool accessory along the driving axis by power of the motor, wherein:
    the tool body includes:
        a driving mechanism housing part in which the driving mechanism is housed; and
        a motor housing part in which the motor is housed, the motor housing part being arranged on a rear side of the driving mechanism housing part, and
    at least the motor housing part of the tool body is formed by connecting two halves, the two halves divided along a plane parallel to a rotation axis of the motor shaft.

4. The power tool as defined in claim 1, wherein the handle part is connected to the tool body via the elastic member so as to be movable in the front-rear direction relative to the tool body.

5. The power tool as defined in claim 4, wherein:
    the tool body includes:
        a driving mechanism housing part in which a driving mechanism is housed; and
        a motor housing part in which the motor is housed, the motor housing being connected to a rear side of the driving mechanism housing part,
    the handle part includes a covering part covering at least the rear end portion of the motor housing part,
    each of the motor housing part and the handle part is formed by connecting right and left halves divided along a plane parallel to a rotation axis of the motor shaft, wherein a direction perpendicular to the driving axis and corresponding to an extending direction of the grip part is defined as an up-down direction and a direction perpendicular to the front-rear direction and the up-down direction is defined as a left-right direction,
    one of the covering part and the motor housing part has a projection with a longitudinal axis in the left-right direction perpendicular to the driving axis,
    the other of the covering part and the motor housing part has a guide hole in which the projection is received, the guide hole being an elongate hole that is longer in the front-rear direction and has a depth in the left-right direction, and
    the projection is configured to slide within the guide hole in the front-rear direction between a first position in which the projection is in contact with a front end of the guide hole and a second position in which the projection is in contact with a rear end of the guide hole, along with a movement of the handle part relative to the motor housing part.

6. The power tool as defined in claim 1, further comprising:
    a bearing held by a rear end portion of the tool body, the bearing rotatably supporting the rear end portion of the motor shaft, and
    an intervening member arranged in contact with a rear end of the bearing and a front end portion of the elastic member, wherein:
    the elastic member biases the motor shaft forward via the intervening member and the bearing.

7. The power tool as defined in claim 6, wherein:
    the intervening member is arranged with a clearance from the rear end portion of the tool body in the front-rear direction, and
    the intervening member includes an engagement part engaged with the front end portion of the elastic member.

8. The power tool as defined by claim 1, wherein:

the motor includes a stator supported by the tool body and a rotor that rotates with the motor shaft; and the elastic member is configured to restrict movement of the rotor relative to the stator supported by the tool housing in the front-rear direction.

9. The power tool as defined by claim 1, further comprising an intervening member located between the rear portion of the motor shaft and the elastic member; wherein:

the intervening member is movable in the front-rear direction relative to the tool body; and the elastic member biases the motor shaft via the intervening member.

10. The power tool as defined by claim 9, further comprising a bearing rotatably supporting the rear end portion of the motor shaft, wherein the elastic member biases the motor shaft via the intervening member and the bearing.

11. A power tool configured to linearly reciprocate a tool accessory along a driving axis extending in a front-rear direction, the power tool comprising:

a tool body extending along the driving axis in the front-rear direction;

a motor having a motor shaft, the motor shaft being rotatably supported by the tool body and extending in the front-rear direction;

a handle part including a grip part, the grip part extending in a direction crossing the driving axis;

an elastic member interposed between a rear end portion of the motor shaft and an inner wall surface of the handle part;

a bearing held by a rear end portion of the tool body, the bearing rotatably supporting the rear end portion of the motor shaft; and an intervening member arranged in contact with a rear end of the bearing and a front end portion of the elastic member, wherein:

the elastic member biases the motor shaft and the handle part away from each other in the front-rear direction;

the elastic member biases the motor shaft via the intervening member and the bearing;

the intervening member is arranged with a clearance from the rear end portion of the tool body in the front-rear direction; and the intervening member includes an engagement part engaged with the front end portion of the elastic member.

* * * * *